(12) United States Patent
Cahn (10) Patent No.: US 8,917,869 B2
(45) Date of Patent: Dec. 23, 2014

(54) CREATION AND MONITORING OF "FAIR PLAY" ONLINE GAMING

(71) Applicant: Robert S. Cahn, Carmel, NY (US)

(72) Inventor: Robert S. Cahn, Carmel, NY (US)

( * ) Notice: Subject to any disclaimer, the term of this patent is extended or adjusted under 35 U.S.C. 154(b) by 82 days.

(21) Appl. No.: 13/745,926

(22) Filed: Jan. 21, 2013

(65) Prior Publication Data

US 2013/0190071 A1 Jul. 25, 2013

Related U.S. Application Data

(60) Provisional application No. 61/589,476, filed on Jan. 23, 2012.

(51) Int. Cl.
*H04K 1/00* (2006.01)
*G07F 17/32* (2006.01)

(52) U.S. Cl.
CPC ........ *G07F 17/3241* (2013.01); *G07F 17/3225* (2013.01); *G07F 17/3293* (2013.01)
USPC ...................................................... 380/251

(58) Field of Classification Search
CPC ............ G07F 17/3241; G07F 17/3225; G07F 17/3293
USPC ...................... 380/251; 463/22, 42
See application file for complete search history.

(56) References Cited

U.S. PATENT DOCUMENTS

| | | | |
|---|---|---|---|
| 6,149,522 A | 11/2000 | Alcorn et al. | |
| 6,659,861 B1 * | 12/2003 | Faris et al. | 463/1 |
| 7,097,559 B2 * | 8/2006 | Okita et al. | 463/11 |
| 7,300,056 B2 | 11/2007 | Gioia et al. | |
| 7,406,529 B2 * | 7/2008 | Reed | 709/229 |
| 7,584,154 B1 | 9/2009 | Chen et al. | |
| 7,604,541 B2 | 10/2009 | Aikin et al. | |
| 8,092,309 B2 | 1/2012 | Bickley | |
| 8,195,578 B2 | 6/2012 | Luzzatto | |
| 2003/0078102 A1 | 4/2003 | Okita et al. | |
| 2005/0108027 A1 | 5/2005 | Horger | |
| 2006/0089189 A1 | 4/2006 | Harvey | |
| 2006/0094497 A1 | 5/2006 | Presman | |
| 2009/0011829 A1 | 1/2009 | Yang | |

FOREIGN PATENT DOCUMENTS

| | | |
|---|---|---|
| JP | 11-114228 | 4/1999 |
| WO | WO 00-50974 | 8/2000 |
| WO | WO 02-065341 | 8/2002 |

* cited by examiner

*Primary Examiner* — Samson Lemma
(74) *Attorney, Agent, or Firm* — Wendy W. Koba (57) ABSTRACT

A "fair play" online gaming system comprises a deal server for generating an encrypted set of gaming elements (such as cards) and a play server for controlling a set of operations within a game. The play server is coupled to the deal server and receives encrypted gaming elements from the deal server in response to commands. The gaming system also includes an audit server that is coupled to the play server, where the audit server is used to send and receive information between the play server and one or more online players communicating via the internet. Importantly, the deal server and the play server cannot communicate with the internet and cannot be accessed by untoward individuals, thus providing fair play conditions for an online game.

7 Claims, 7 Drawing Sheets

CREATION AND MONITORING OF "FAIR PLAY" ONLINE GAMING

CROSS-REFERENCE TO RELATED APPLICATION

This application claims the benefit of U.S. Provisional Application No. 61/589,476, filed Jan. 23, 2012 and herein incorporated by reference.

TECHNICAL FIELD

The present invention relates to the creation and control of online gaming and, more particularly, to the use of encrypted processes and separate, independent entities within an online gaming environment to ensure a "fair play" condition.

BACKGROUND OF THE INVENTION

The online variant of many card games as offered in a casino (for example, poker, blackjack, keno or the like) provides significantly different challenges to the detection of cheating on the part of the dealer than traditional table games. For example, in the online environment, there is obviously a lack of physical contact between the players and the dealer. Indeed, maintaining secure, fair games in online gaming is a difficult and complicated issue for online gaming firms. Although there are many ways to unfairly play the games, one on-going problem is the suspicion on the part of the players that the card deck may be manipulated by the computer system that creates the "electronic deck" and deals the cards.

With the availability of online gambling, issues regarding the integrity of the "electronic dealer" are problem areas that gate the expansion of this industry. That is, there is a suspicion by some players that a computer-controlled system can control the deal of the cards and, therefore, is not "playing fair". Indeed, if a site is involved in using real money to stage a poker game, it is relatively easy for an actual "human" player to be contracted to play for the company controlling the online computer system and be given an advantage. For instance, a deck may be manipulated by a computer-controlled dealer such that a priori certain winning cards will be dealt to the contract player (i,e., the "shill" that is working for the company). If the advantage is not blatant, and is not over-used, it is possible for a rigged gaming site to carry on for an extended period of time.

SUMMARY OF THE INVENTION

The need remaining in the prior art is addressed by the present invention, which relates to the creation and control of online gaming and, more particularly, to the use of encrypted processes and separate, independent entities to ensure a "fair play" condition.

In one embodiment, the present invention relates to an online gaming system comprising a deal server for generating an encrypted set of gaming elements (such as cards) and a play server for controlling a set of operations within a game. The play server is coupled to the deal server and receives encrypted gaming elements from the deal server in response to commands. The gaming system also includes an audit server that is coupled to the play server, where the audit server is used to send and receive information between the play server and one or more online players communicating via the internet. Importantly, the deal server and the play server cannot communicate with the internet and cannot be accessed by untoward individuals, thus aiding in the creation of fair play conditions for an online game.

BRIEF DESCRIPTION OF THE DRAWINGS

Embodiments of the present invention will become apparent from the following detailed description, the appended claims, and the accompanying drawings in which like reference numerals identify similar or identical elements.

DETAILED DESCRIPTION

Figure 1:
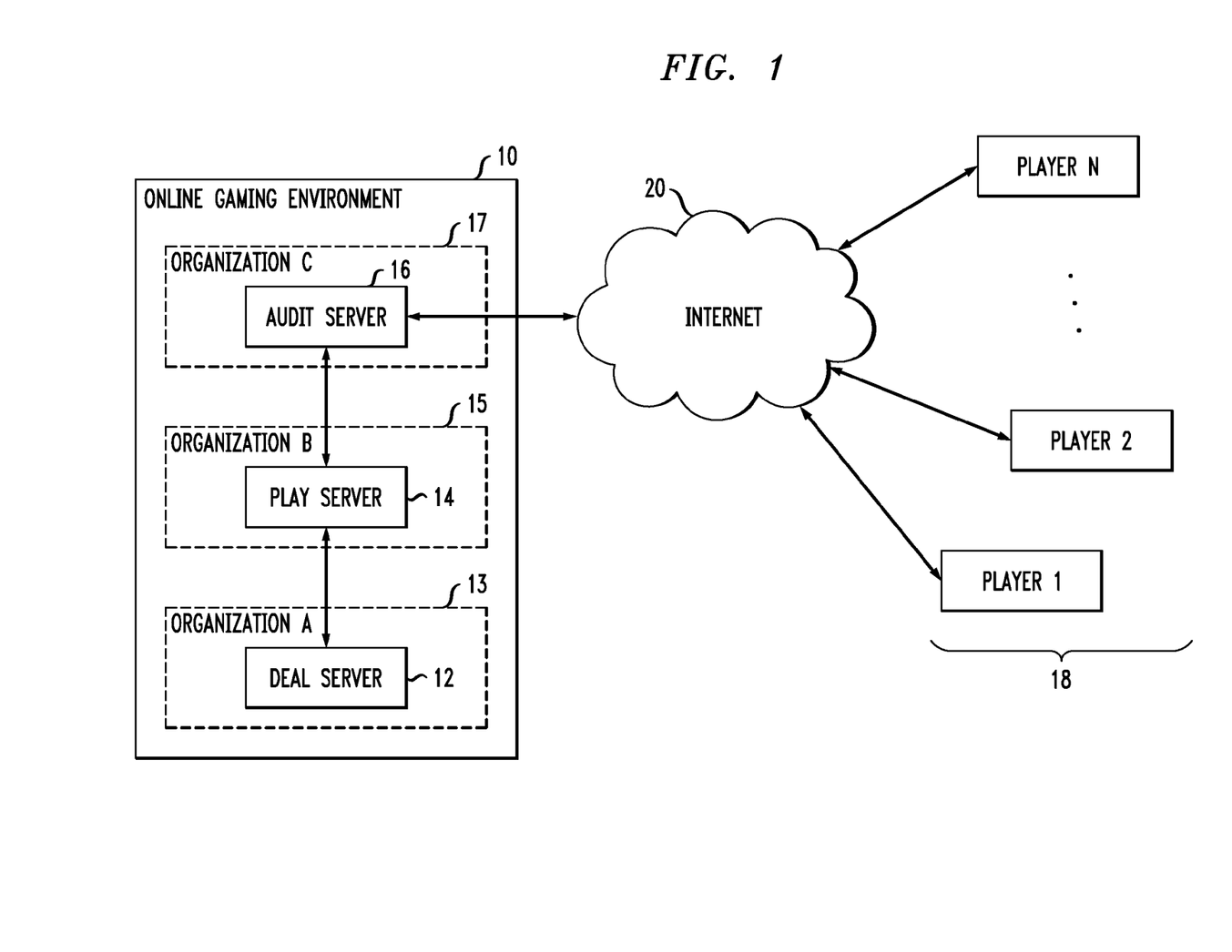
FIG. 1 is a diagram of a network architecture within which a "fair play" online casino card game can transpire in accordance with the present invention.

FIG. 1 is a diagram of a network architecture within which a "fair play" online casino card game can transpire in accordance with the present invention. As will be described in detail below, it is an aspect of the present invention that the gaming process is divided between separate entities, in a double-blind form, such that any opportunity for collusion between an entity that creates an original "shuffled" deck and an entity that deals the cards (electronically simulated) to the players is eliminated. Additionally, encryption processes are added to the actual "play" of the cards to ensure that only authenticated players are able to "see" the cards being dealt.

Referring to the details of FIG. 1, an online gaming environment 10 is shown as comprising three separate and distinct entities that communicate with one another in the manner described below to create a "fair play" system. In particular, online gaming environment 10 comprises a deal server 12 that is owned and controlled by Organization A, a play server 14 that is owned and controlled by Organization B and an audit server 16 that is owned and controlled by Organization C. As also shown in FIG. 1, a plurality of separate players 18 (shown as Player 1, Player 2, . . . Player N) interact with gaming environment 10 through the internet, shown as element 20 in FIG. 1.

As will be described in detail below, deal server 12 functions to create a deck of cards for game purposes by first "randomizing" a set of "gaming elements", where the gaming elements may take the form of, for example, a simulated deck of playing cards, a series of dice throws, a set of spins of a virtual roulette wheel, etc. Once randomized, deal server 12 then functions to encrypt the randomized set of gaming elements.

For the ease of discussion, the remainder of the discussion will describe the principals of the present invention as related to an online gaming environment where the gaming elements comprise a deck of cards ('virtual cards'). It is to be understood that the selection of playing cards is illustrative only, and the principals of the present invention apply in the broader context to any time of online gaming involving a random set of gaming elements.

Returning to the depiction in FIG. 1, once the game elements (in this example, using simulated cards as the game elements) have been randomized and encrypted, the actual online gaming can begin. Play server 14 then communicates with deal server 12, using three different commands: "new deal", "new card" and "finish deal". Audit server 16 sits between play server 14 and the plurality of players 18, and is used to ensure that any of the rules associated with a specific game are not broken (i.e., audit server 16 can be thought of as the "pit boss" for the online game).

It is an aspect of the present invention that each of these servers is a "secure processor" and cannot be accessed by anyone other than an authenticated owner. By a "secure processor", it is meant that the actual computer hardware components performing the required actions are reasonably physically secure. Physical security is indicated in FIG. 1 by the dotted line boxes separately surrounding each server, where a boundary 13 is shown as surrounding deal server 12, boundary 15 surrounding play server 14 and boundary 17 surrounding audit server 16. Many of the current commercial web-hosting providers offer a "secure server" service. In these situations, the provider has a physical location with guards, monitoring systems, alarm systems and the like to provide protection against unauthorized access to a given server. In this example, the three servers described above may be located in separate buildings or, preferably, in the same building but each server locked within its own "cage" (equated with the dotted line boundaries in FIG. 1).

In accordance with the present invention, an additional layer of security is provided by permitting only a single point-to-point contact between each of the servers, connected in the manner as shown in FIG. 1. In particular, deal server 12 can only communicate with play server 14 and play server 14 can only communicate with deal server 12 and audit server 16.

Importantly, neither deal server 12 nor play server 14 is able to communicate over the internet, even for network management purposes. Preferably, an independent security audit is used to verify the "stand alone" status of both deal server 12 and play server 14. If either of these systems begins to malfunction, it can receive "reboot" instructions from its associated "upstream" server, but cannot be serviced remotely. Also, any logs from either deal server 12 or play server 14 can only be downloaded by physically placing the respective server into maintenance mode, disconnecting the server from the other elements along the signal path, and then connecting the disconnected server to a maintenance server (such as a laptop equipped with the proper authentication code).

Since there are no network connections, audit server 16 also functions to pass along messages (such as "keep alive" messages) between owning organizations A, B and C and servers 12 and 14. To avoid hidden commands, audit server 16 is configured so that these messages are only accepted at given times (on the half hour, for example) and only accepted from pre-agreed IP addresses. In a preferred embodiment, deal server 12 and audit server 16 may share a secret key, and that the "keep alive" messages involving the ability of deal server 12 to decrypt a secret message also be able to be decrypted by audit server 16. In this way, there is no opportunity for deal server 12 to be secretly instructed with respect to ordering a certain deck for upcoming deals.

By strictly enforcing this communication policy, as well as the "secure location" environment, the opportunities for an unauthorized individual to gain access to the online gaming environment and rig any aspect of a game is virtually eliminated. However, while this architecture provides this assurance, there remain problems associated with unscrupulous owners of one of entities described above creating an unfair advantage for a player that may be acting as a shill.

Thus, the present invention also contemplates the use of encrypted transmissions between each of the entities in order to assure that each element is cooperating in a "fair play" environment. The following discussion and drawings will describe the operations of each of these entities, and then present exemplary "game" situations which illustrate the exchange of communications between these entities.

Figure 2:
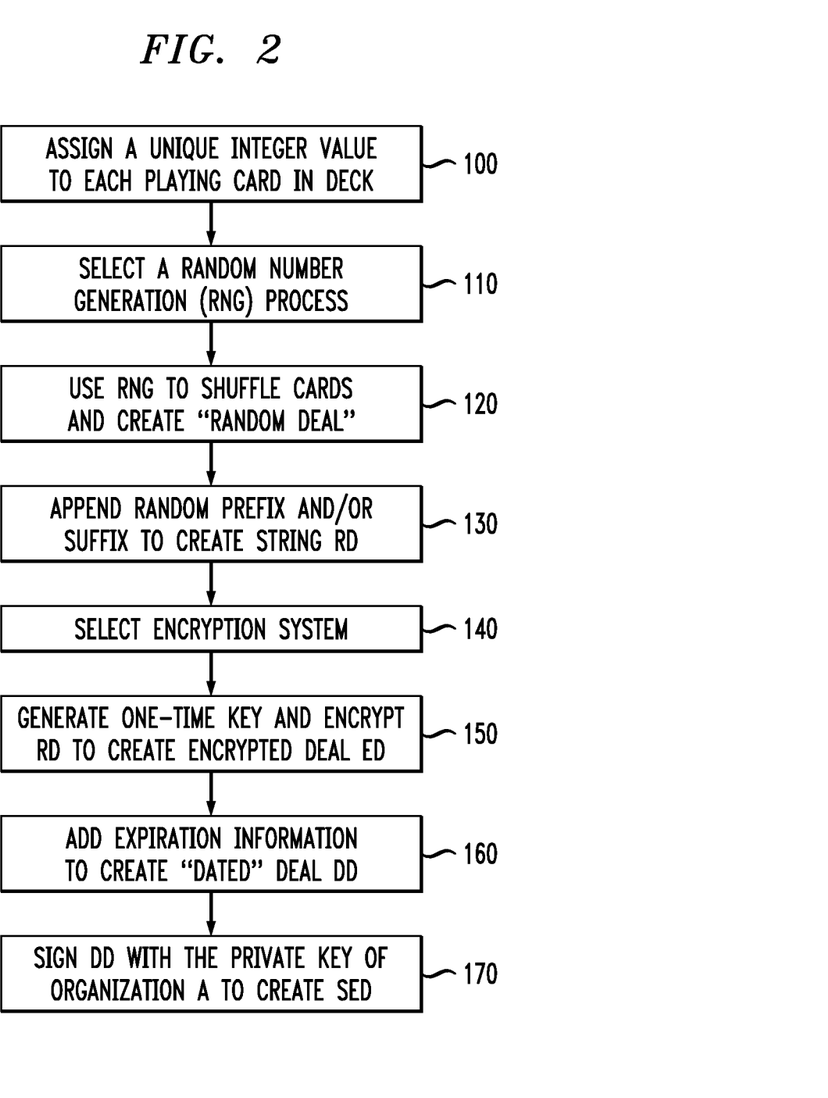
FIG. 2 is a flowchart of an exemplary process for creating an encrypted deck of cards, as prepared by the deal server in accordance with the present invention.

A flowchart of an exemplary process for creating an encrypted deck of cards, as prepared by deal server 12, is shown in FIG. 2. While not described or illustrated in detail, it is to be understood that server 12 (as well as servers 14 and 16) contain one or more processors, databases, memories and the like that are capable of accepting instructions, manipulating data and generating the desired output sequences necessary to create an online gaming environment.

In order to perform an encrypted deal, deal server 12 first needs to randomize the order of a given set of cards, and then encrypt the random order. Referring to FIG. 2, the process is shown to begin at step 100 by assigning a unique integer value to each card in the deck. Presuming, for the sake of example, that a standard poker/bridge deck of 52 cards is being used, the initial unique integer assignment may take the form of (integer, card) value pairs as follows:

- (1, 2♣)
- (2, 3♣)
- ...
- (13, A♣)
- (14, 2♦)
- (15, 3♦)
- ...
- (26, A♦)
- (27, 2♥)
- ...
- (52, A♠)

Once all of the cards have been assigned a unique integer value, the process moves to step 110 and selects a particular random number generator (RNG) to use to "shuffle" the deck by randomizing the assigned unique integer values. Since there is no perfect random number generator, it is truly a "pseudo-random" number generator that is used for this purpose. Various ones of these generators are well-known in the art, and any may be used at this point in the process.

With the selection of a random number generator, the next step in the process (shown as step 120) is to apply the random number generator to the set of unique integers $\{1, 2, \ldots, 52\}$ and create a shuffled deck, referred to herein as a "random deal". An exemplary "random deal" might look like the following string of numbers:

{42, 35, 18, 11, 25, . . . , 9}, containing all 52 numbers one and only one time in the random deal sequence. As a further precaution for security reasons, it is preferred to append a random prefix and/or suffix to random deal string (shown as step 130) so as to make the deal itself more resistant to tampering. A random deal (RD) then is defined as follows:

RD=PREFIX<deal>42, 35, 18, 11, 25, . . . , 9</deal>SUFFIX.

It is to be understood that the inclusion of a "prefix" and "suffix" is exemplary only and is used to increase the level of security and decrease the likelihood of success for a standard "crypto" attack. Indeed, it is possible to utilize a system of the present invention where the random string of 52 integers is encrypted without first adding a prefix and/or suffix.

To create an encrypted deal, the next step in the process, shown as step 140, is to select a suitable encryption system. As with random number generators, there are a variety of encryption systems that may be employed to provide the desired level of security for the online gaming system of the present invention. Systems such as, for example, Data Encryption Standard (DES), triple DES (i.e., DES performed three different times, with three different keys), AES or RSA are all viable alternatives, where these are just a selection of a few of many encryption offerings.

Once the selection of an encryption system has been made, one or more keys are generated for a "one time" use (step 150), and then used to encrypt the random string (step 160) to create an "encrypted deal" (ED), where $ED_i = Enc(Key_i, RD_i)$, where "i" denotes the one-time nature of both the key and the random deal. While the encryption mechanism is published and generally available, the RD and the Key are secret and not revealed until the conclusion of the game, as described below.

While this encryption is sufficient to mask the identity of the order of the specific cards in this particular "shuffled" deck, there is no certainty that this deck will only be used once. Without some mechanism to ensure that this particular deck, in this order, would not be re-used, it would be relatively easy and straightforward for a player to learn the ordering of the cards in a deck that is used over and over. Moreover, without some sort of "expiration date", play server 14 could conceivably "hold back" an encrypted deal and work on it to break the encryption. The "fair play" concept would certainly be severely compromised if play server 14 knew the value of the cards it was dealing.

Thus, the next step performed by a processor within deal server 22 is to append a sequence number (i.e., a unique identifier of this particular deck) and "expiration date" to the encrypted deck, creating a "dated deal" (DD). This step is shown as step 160 as creating the following:

date, the post-pended fields including a unique serial number, expiration date and creation date are the types of information that can be evaluated by audit server 16 to ensure that play server 14 is not attempting to use a "stale", expired deck (which may have been compromised/decrypted by play server 14).

The final step, shown as step 170 in the flowchart of FIG. 2, is to "sign" this encrypted deal with the private key of Organization A, the owner and controller of deal server 12. The output from this step then looks as follows:

$SED_i = Sign_{PrivKeyA}(DD_i)$.

It is anticipated that players will have a list of trusted Deal Servers that they regard as honest. Thus, anyone may decline to play in a game with cards provided by an untrusted server.

With this understanding of the creation of a "signed", encrypted deck of cards by deal server 12, it is possible to better understand the flow of information between deal server 12 and play server 14. It is to be understood that deal server 12 has no idea about the type or types of "games" being run by play server 14, or the identity of any of the players—deal server 12 is limited to only create and control the dispensing of cards in a random, encrypted deck to play server 14. Similarly, play server 14 has no idea about the order of the cards in the encrypted deck; its only functions are to control the game, sending cards to players as requested. As will be described below, depending on the game, play server 14 will send cards either "face up" with the value exposed (hereinafter referred to as UP) or "face down" with the value hidden (DOWN) to different ones of the players.

Figure 3:
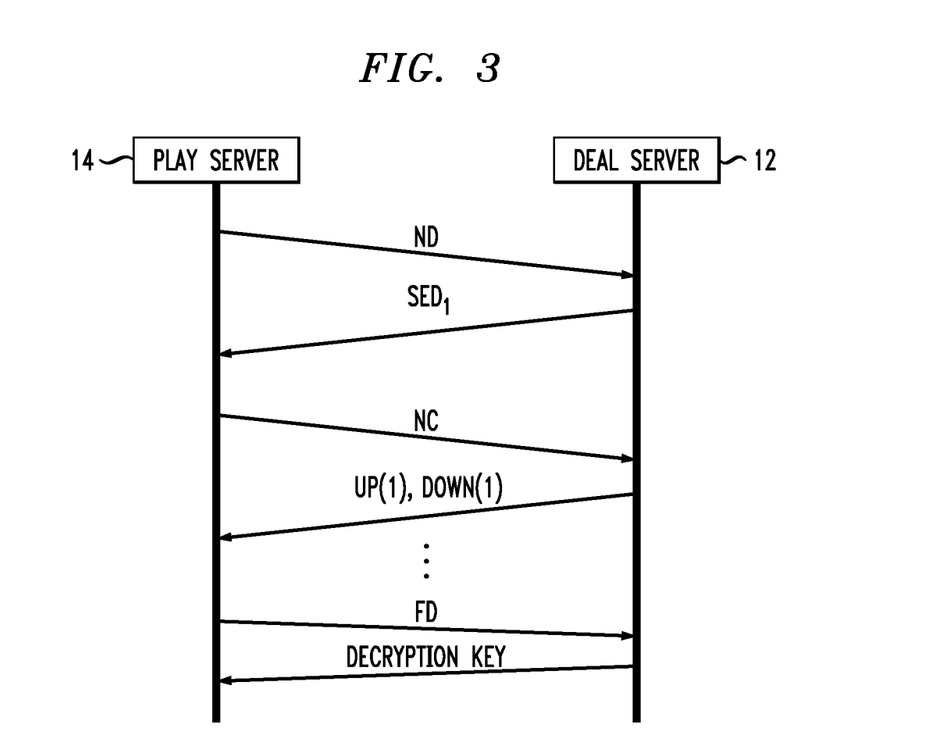
FIG. 3 contains a diagram illustrating the communication flows between the play server and the deal server in accordance with the present invention.

FIG. 3 contains a diagram illustrating the communication flows between play server 14 and deal server 12. As mentioned above, there are three different commands that are transmitted from play server 14 to deal server 12: "new deal" (ND), "new card" (NC) and "finish deal" (FD). ND signifies the beginning of a new game by play server 14, NC is used to transmit card values, one at time, from deal server 12 to play server 14, and FD signifies the end of a game.

Referring to FIG. 3, play server 14 is shown as initially sending a ND command to deal server 12. In response, deal server 12 sends a new signed encrypted deal $SED_i$, formed as described above to play server 14. At this point, play server 14 has not been sent the decryption key and, therefore, does not know the specific ordering of the cards in the deck. As a result, play server 14 cannot control which cards are sent to the players. Play server 14 will forward this signed encrypted deck through audit server 16 to each of the players. All the entities will verify that the signature is valid (by use of the public key of Organization A—the owner of deal server 12) and that the SED has not expired. If these conditions are violated, then deal server 14 will reject the deck or, alternatively, any individual player may signal a problem with the deal.

Following this, play server 14 then sends a NC command to deal server 12. It is to be understood that if play server 14

$DD_i$=<deal>$ED_i$</deal><deal_server>Organization A</deal_server><server_id>FDI2243</server_id>
   <sequence>1234567</sequence><expires>Jan22,2012EDT11:30</expires>
     <created>Jan22,2012EDT11:29</created>

The first two fields included in this DD sequence, associated with the identity of deal server 12, can be used by audit server 16, as described in detail below, to authenticate the dealer as a registered "source" of cards for online gaming purposes. For the present purpose of creating an expiration sends a NC command to deal server 12 without first having established communication using a "ND" command, play server will receive an error message in return (perhaps something like "no current game exists"). If play server 14 sends a NC command and all 52 cards have already been used in the current game, a different error message will be returned (perhaps something like "no more cards in the deck").

Presuming that the NC command is received in the proper time sequence, and there are cards remaining in the deck, deal server 12 responds to the NC command by sending the index of the next card in the deck to play server 14. As mentioned before, every card is supplied in two formats: UP and DOWN. It is the responsibility of play server 14 to know which format to use for the particular card being sent to a player. For example, the payload of the UP deal for the ninth card from an encrypted deck may look as follows:

```
UP=<card>K Spades</card><order>9</order>
<deal_server>Organization A</deal_server><server_id>FDI2243</server_id>
<sequence>1234567</sequence><expires>Jan22,2012EDT11:30</expires>
<created>Jan22,2012EDT11:29</created>
```

Additionally, it is to be understood that the card will be signed by the key of deal server 12 to authenticate the card to play server 14. Along with sending the UP format, deal server sends the DOWN form to play server 14, where the DOWN format may look as follows:

```
DOWN=<card>down</card><order>9</order>
<deal_server>Organization A</deal_server><server_id>FDI2243</server_id>
<sequence>1234567</sequence><expires>Jan22,2012EDT11:30</expires>
<created>Jan22,2012EDT11:29</created>
```

Like the UP card, this payload is signed by the private key of deal server 12 to authenticate the card at play server 14. It is to be remembered, as mentioned above, that deal server 12 has no knowledge of how the cards are used by play server 14; it merely supplies cards upon request. As part of the responsibilities of audit server 16, it will be shown that there can be no flow of information about the game (or the players) back to deal server 12 from play server 14.

The last type of command that may be communicated between play server 14 and deal server 12 is the "finish deal" (FD) command, which signifies that the current game is over. In response to receiving an FD command, deal server 12 will send the decryption key for the current game to play server 14, and thereafter through audit server 16 to the individual players. With this information, the identity of all of the cards involved in the game can be revealed. Each player can then check the cards that were exposed to them during play against the cards in the decrypted deck. If a suitable number of cards have been exposed during play, there is only a very slight probability of cheating going undetected (in circumstances where the cheating involves the substitution of one card for another). Indeed, if a card substitution is discovered, the player will have the messages in his/her possession to prove that the game has not been fairly played.

Sometimes during a game, a player is bluffing. In this case, the player may then not wish others to know about the bluff, which would happen if all of the players receive the decryption key for the entire deck at the end of the hand. As will be discussed below, there are different specific ways that this can be handled. Variations of the present invention have been developed to address that concern, as described hereinafter.

As mentioned above, the owner of deal server 12 (here, identified as Organization A) guarantees that the cards are dealt randomly. When play server 14 receives the decryption key at the end of game (in response to the FD command that play server 14 sent to deal server 12), it is possible for the owner of play server 14 (in this case, Organization B) to analyze the series of deals as much as is desired and make sure that nothing untoward is happening.

It is presumed that Organization A will be required to have insurance that compensates Organization B should any irregularities be found among successive deals within a given (minimal) sample size. Obviously, the exact nature of the agreement between Organizations A and B can vary, but the intent is that if it found out that a certain game has been rigged, the fault lies with the "creator" of the deck—deal server 12.

A similar accountability relationship is created between play server 14 and audit server 16. Audit server 16 functions to provide the players of a game with a guarantee that play server 14 creates and controls an honest game. For example, audit server 16 may offer to repay any losses if dishonesty can be proved by a player, or offer a flat payment to any players involved in a game that is proven to be rigged (or any other suitable arrangement). Indeed, as mentioned above, audit server 16 can be thought of as having the job of a "pit boss" in a casino. Audit server 16 watches the play, acting as a gatekeeper between play server 14 and players 18, to ensure that play server 14 is not privately communicating with any of the players 18.

It is also anticipated that the connections between audit server 16 and each player 18 utilizes Secure Sockets Layer (SSL) as a cryptographic protocol useful for internet-based communications or, alternatively, a more robust type of encryption. Presumably, all messages between audit server 16, deal server 12 and play server 14 will be "clear", except for the initial transmission of the encrypted deal.

Figure 4:
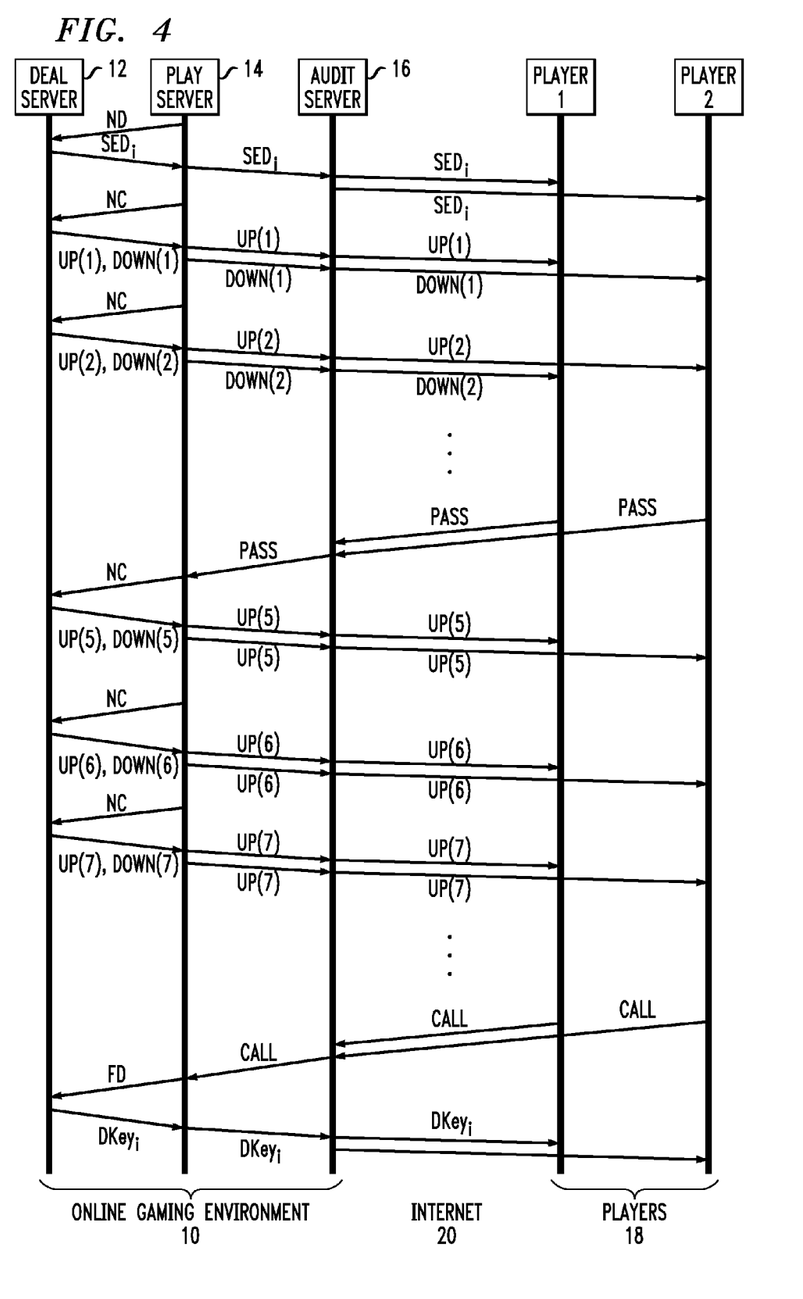
FIG. 4 contains a diagram showing the flow of communications between the various elements involved in a simple game (in this case, a type of poker), showing the operation of each of the servers and the progress of the game for the involved players.

FIG. 4 contains a diagram showing the flow of communications between the various elements involved in a simple game (in this case, a type of poker), showing the operation of each of the servers and the progress of the game for the involved players. For the sake of clarity, it is presumed that there are only two players involved in this game. As shown, play begins with play server 14 sending an ND command to deal server 12. In response, and as discussed above in association with FIG. 3, deal server 12 sends a "signed" encrypted deal $SED_i$ to play server 14. Play server subsequently forwards $SED_i$ T to both players 1 and 2, where each of these transmissions first passes through audit server 16.

Audit server 16 can, therefore, check the signature on these transmissions to ensure that the source (in this case, deal server 12) is an authenticated deal server. Additionally, audit server 16 may perform its own encryption on the messages to be forwarded to the players, where both Player 1 and Player 2 will have previously exchanged session keys with audit server 16 and be able to read messages received from audit server 16. This additional layer of encryption provides additional assurance to the online gaming players that the various entities forming online gaming environment have been vetted and are providing a "fair play" experience.

Once Players 1 and 2 have received the signed, encrypted deal, the game moves forward with play server 14 sending an NC command to deal server 12. As shown in FIG. 4, deal server 12 responds by sending the pair UP(1), DOWN(1) to play server 14. The integer "1" indicating that this is the first (top) card in the shuffled deck. As mentioned before, deal server 12 has no idea if the particular card is going to be dealt "face up" or "face down" and, in fact, is intentionally configured in accordance with the present invention to never know how any card is played. It is the responsibility of play server 14 (rather, the gaming algorithms within a processor that forms part of play server 14) to understand the game and "know" which version of the card (UP or DOWN) to pass along to each player.

Looking at the flow as shown in FIG. 4, play server 14 passes UP(1) to Player 1 and DOWN(1) to Player 2. As shown, each of these communications passes through audit server 16 which may review the command, encrypt the command even further. For the sake of example, it is presumed that this first card is the King of ♠ (which will only be known by Player 1 at this point). Continuing, play server 14 sends another NC command to deal server 12, which responds with the pair UP(2), DOWN(2). In this example, it is presumed that card number 2 in the shuffled deck is the 3 of ♦. Play server 14 then proceeds to send DOWN(2) to Player 1 and UP(2) to Player 2. In each case where a player receives a DOWN card, this is used to let the player know that a card has been dealt to another player in the game. This is only one exemplary method of determining how the players can "visualize" the cards dealt to the other players. While not described in detail and not considered germane to the subject matter of the present invention, it is to be understood that each specific game will include a number of different commands and responses for modifying and updating the display as used by the players to interact with the game. The process continues with more cards being dealt, as required for the particular game being played.

Figure 5:
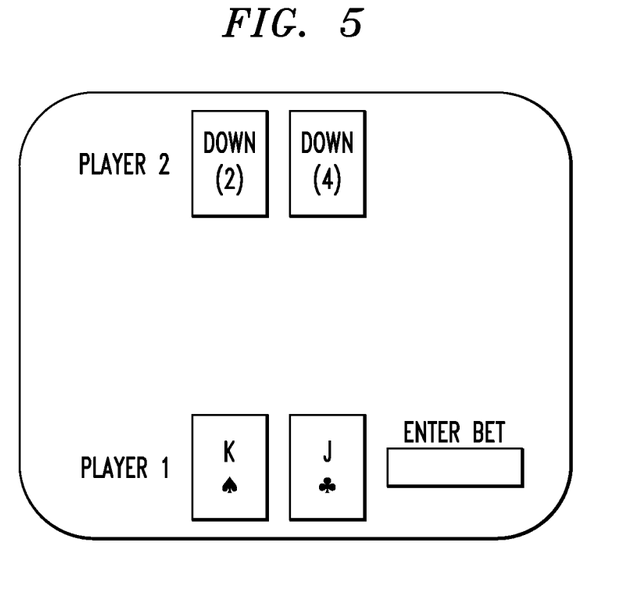
FIG. 5 is a representation of an online gaming board for Player 1 in a two-player game.
Figure 6:
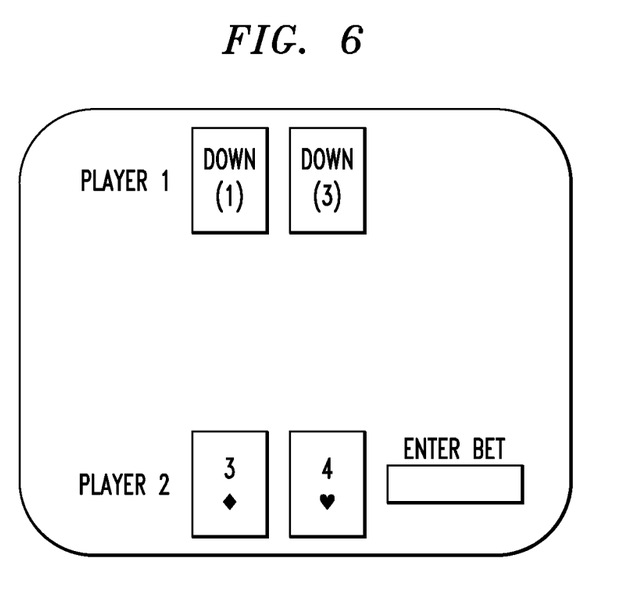
FIG. 6 is a representation of the same online gaming board, in this case shown from the perspective of Player 2.

Once each player has received two "UP" cards, a representation of the play can be formed on a screen or display of the gaming devices being used by players, which takes the form as shown in FIG. 5, which is a representation of the board for Player 1. A representation of the same game, from the perspective of Player 2, is shown in FIG. 6. The gaming devices may be, for example, a computer, a smartphone, tablet, or any other device capable of communicating with the internet and, preferably, including a graphical user interface (GUI).

At this point in the process, play continues with Player 1 either entering a bid (for example, by inserting a dollar amount in block 50 in the display of FIG. 5) or passing. Again, audit server 16 performs the function of verifying all of the flows. For example, suppose that play server 14 attempts to aid Player 2 by telling the identity of Player 1's cards to Player 2. That is, instead of sending DOWN(1) and DOWN(3) to Player 2, it sends the messages UP(1) and UP(3).

It is a role of audit server 16 to flag this error and trigger an alarm that play server 14 has violated a "fair play" rule. Since there are no additional signal paths (back channels) between play server 14 and the various players, all communications must pass through audit server 16, which is therefore properly positioned to monitor the actions of play server 14 and prevent collusion between the "electronic dealer" and one or more players.

Presuming fair play, the process continues with Players 1 and 2 placing bets and/or passing, calling or raising. It is to be presumed that financial arrangements are handled before the game begins, and that play server 14 knows the limits of each player in the game. This aspect will be discussed in more detail below. Presuming, with reference to FIG. 4, that each player has sent a PASS command to play server 14, the game continues with play server 14 sending three NC commands to deal server 12. These three cards are then transmitted in the UP format to both Players 1 and 2.

Again, all flows pass through audit server 16. With this deal of the "community cards", another round of betting transpires. The final part of the play then proceeds as shown in the flow diagram of FIG. 4 with play server 14 sends an FD command to deal server 12 (indicating that the current game is over). Deal server 12 responds by sending the decryption key $DKey_i$ to play server 14. As shown, $DKey_i$ is then forwarded to Players 1 and 2 through audit server 16 (which, as before, is able to verify the authenticity of this message).

At this point, Players 1 and 2 use this key to decrypt the encrypted deal $SED_i$ that was sent to them at the beginning of the game. With this information, they can compare the specific cards that have been dealt to them (and their opponents) with the actual values of the cards in the deck. Presuming that everything matches, all is well and the payout is made. Alternatively, if a player notices a mismatch between a card dealt during play, and the value of the decrypted card in the deck, a message is sent to audit server 16, informing server 16 of the "foul play".

One of the consequences of this sequence of operations in this specific online gaming process is that once the decryption key $DKey_i$ is sent to all of the players, then everyone will know all of the cards that were otherwise not shown during the game (that is, the DOWN cards of their fellow players). One important consequence of this action is that the players can see who was bluffing and who was not. This information is generally not available during "in person" play at a gaming table.

There are at least two modifications to the process of the present invention as described above that address this concern and allow for a player's down cards to remain anonymous (at least for a period of time). The first solution is referred to as "delayed decryption key distribution" (DDKD), and the second is "individually encrypted card" (IEC) play. Each will be described below in turn.

For the case of DDKD, the process as shown in the flow of FIG. 4 is "surrounded" by a pair of commands that start and end a multiple-hand game. In particular, a "start session" (SS) command is used to start a session, and is sent from play server 14 to deal server 12.

Figure 7:
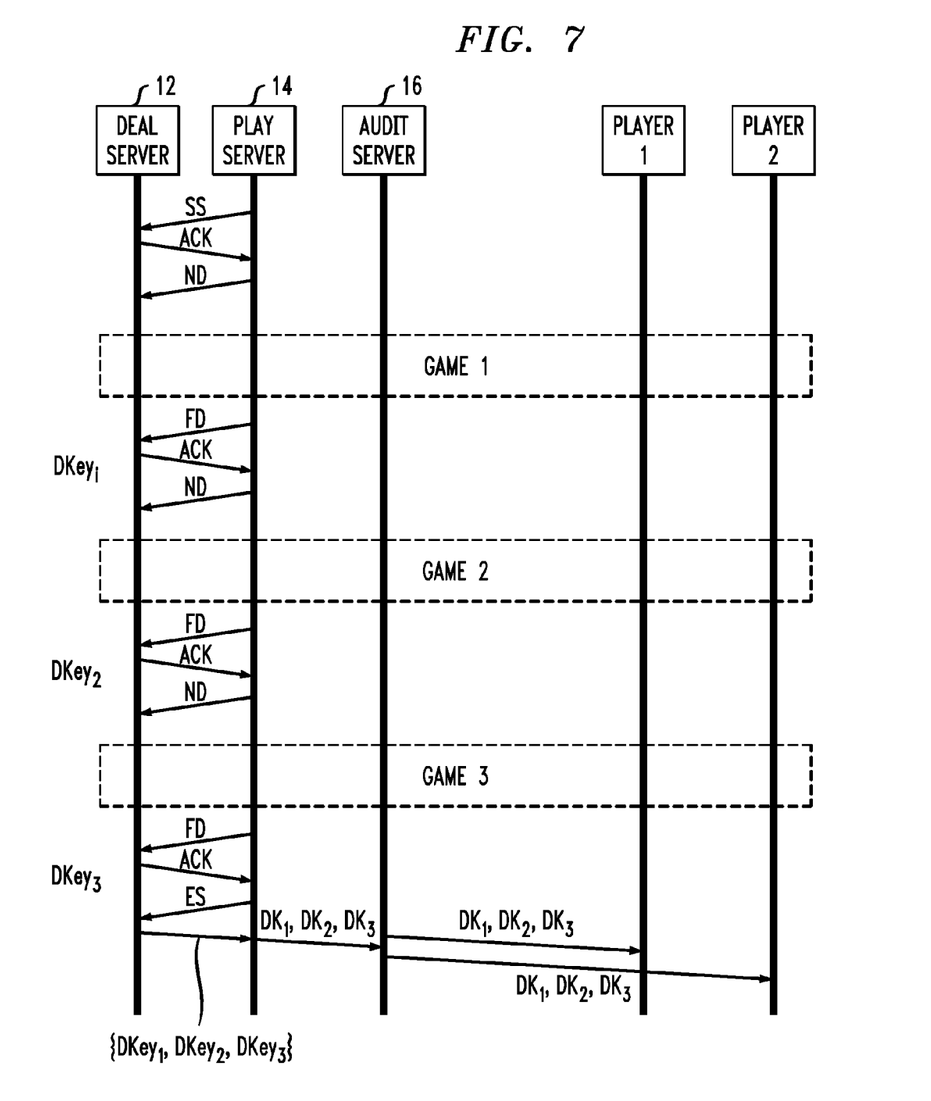
FIG. 7 illustrates the details of the modified aspects of the use of a "delayed" decryption key transmission, showing the "start session" and "end session" commands as sent from the play server to the deal server.

FIG. 7 illustrates the details of the modified aspects of the use of DDKD, showing the DDKD command as sent from play server 14 to deal server 12. In this mode of operation, an ND command can be sent and accepted only after an SS command has been acknowledged (ACK). This SS command has the effect of changing the process that occurs after play server 14 sends an FD command to deal server 12. In particular, when initiated by an SS command, deal server 12 will not send the decryption key to play server 14 at the end of a game, but will retain the key and associate that specific decryption key with that specific game (thereafter sending an ACK to play server 14). As shown in FIG. 7, the process continues with play server 14 sending another ND command to deal server 12, initiating a new game. This process may be repeated multiple times, where at the end of each individual game, deal server 12 will associate the specific decryption key with the game.

Finally, when it is decided that the gaming session has come to a close, play server 14 sends an End Session (ES) message to deal server 12. At this point, as shown in FIG. 7, deal server 12 forwards the complete set of decryption keys through play server 14 and audit server 16 to the individual players. The various keys will carry designations that allow for the players to associate the proper keys with their unique games. If any player leaves the online gaming environment before the end of the session (say, when their funds are exhausted), he/she will only receive those decryption keys for the games in which they participated.

Both the SS and ES commands are controlled by deal server 14, particularly the timing of the issuance of the ES command. For example, the players may agree that the gaming session will end at a predetermined time, or after a predetermined number of hands (or until only one player has any money in the online "bank"). Various other events may be used to control the length of a specific session.

The alternative use of IEC cards may be preferred in the situation where players insist on play where their DOWN cards are not revealed to their opponents—not even at the end of a gaming session (unless their hand has been "called"). In this case, deal server 12 encrypts the card deck in a manner where a different key is used for each card (i.e., uses a set of 52 different keys). Thus, rather than having one encryption key (EKey$_i$) for a given deck of cards (deck "i", for example), an IEC deck of cards as created by deal server 12 will take the form of EK$_{i1}$, EK$_{i2}$, ..., EK$_{i52}$. It may be that all 52 cards are encrypted using the same encryption algorithm, or deal server 12 may use an array of different algorithms for different cards (adding an additional level of security). As before, the entire encrypted deck is sent to the player at the beginning of the game. At the end of play, some cards (UP) have been exposed to all of the players and other cards (including those that have never been dealt) have not been exposed to all of the players.

In this case, when the FD command is sent by play server 14 to deal server 12, only the decryption keys for the dealt cards are forwarded to player server 14. At that point, play server 14 forwards separately to each player only the keys for those cards that have been displayed to that player during the course of the game. While this version of play allows for the individual players to not reveal their hidden cards, this is achieved at the expense of verifying "fair play" more difficult, since the players will not have access to a complete deck for analysis.

In another embodiment of the present invention, it may desired to allow for the players to retain their anonymity; that is, playing without their reputations influencing the course of play. Additionally, it may be desired to add another layer of security to avoid the possibility of groups of players "working together" to beat the house, or gang up on one or more of the other players. Both of these goals can be addressed by given each player an alias (display name) that is different for each opponent (presuming that there are more than two players in a game. For example, presuming that there are four players (Player A, Player B, Player C and Player D) in a particular game, the set of aliases as shown below in Table 1 may be assigned by audit server 16 to control anonymity. Audit server 16 can be particularly configured to incorporate a database for this purpose, with one exemplary form as shown below:

TABLE 1

| Name | Alias | | | |
|---|---|---|---|---|
| | Player A | Player B | Player C | Player D |
| Player A | — | Dog | Cat | Sheep |
| Player B | Red | — | Yellow | Green |
| Player C | Iris | Rose | — | Violet |
| Player D | Fred | Jim | Bob | — |

Using this table, audit server 16 is able to control the "labels" that are displayed for each player on the other players' screens. In this example, therefore, each player will know that he/she is in a game with three other players, but will not know their identity. By using a different set of aliases for each player, the ability for two players to discover that they are playing in the same game (and thus collude to beat the house or other players) is reduced.

While the processes of the present invention are shown above in association with a specific type of poker game, it is to be understood that the overall online gaming environment as described may be implemented to provide "fair play" for a variety of different card games, or even other games in general that utilize a set of randomized gaming elements. As mentioned above, an online gaming environment of the present invention may be configured to provide fair play gaming based on a deck of playing cards, a series of dice throws, a set of spins of a virtual roulette wheel or the like.

Figure 8:
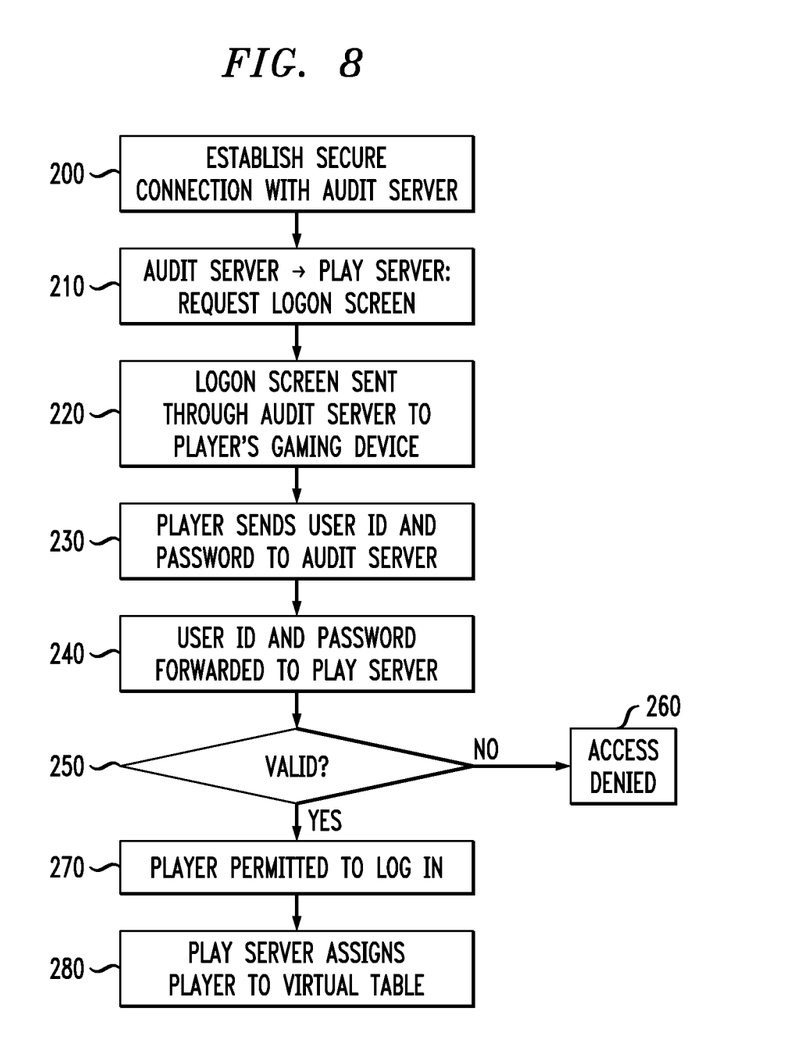
FIG. 8 is a flowchart of a modified sequence of operations useful in controlling the actions of a particular game between an individual and the online gaming system of the present invention.

For example, it is possible to utilize the gaming environment of the present invention to provide an online version of blackjack. In this case, and as evident from the rules of the game, there is no need for anonymity, since each separate player is only playing against the "house". An exemplary flow of steps for providing a blackjack game with online gaming environment 10 is shown in FIG. 8.

In this case, a game begins at step 200 by a player establishes a secure connection with audit server 16. Audit server 16 then sends a request to play server 14 (step 210) for a logon screen for the player. This screen is then forwarded to the player's gaming device, shown as step 220. In response, the player supplies his "user ID" and password to audit server 16 (step 230), and the values are passed to play server 14 (step 240). Play server 14 then checks the validity of this user ID and password against a "player" database (step 250) and, if not found, an "access denied" message is returned to the player (step 260) through audit server 16

Presuming that the player's user ID and password are found in the database, play server 14 then permits the player to log in (step 270). At this point, the player is added to a virtual table with other blackjack players (step 280) and is identified by a "handle" that retains his anonymity. Once the player has been added to a virtual table, he will be included in the next hand, with the flow of the cards being the same as that described above.

The components in the block diagrams and the steps in the flowchart described above are described only as exemplary. The components and steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the process described above may be performed in a different order within the scope of the illustrative embodiments.

Thus, a computer implemented method, apparatus and computer program product are provided in the illustrative embodiments for providing "fair play" online gaming in accordance with the present invention. The invention can take the form of an entirely hardware embodiment, an entirely software embodiment, or an embodiment containing both hardware and software elements. In a preferred embodiment, the invention is implemented in software, which includes but is not limited to firmware, resident software and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device). Examples of computer-readable medium including a semiconductor or solid state member, magnetic tape, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit other computer-readable program code over a communications link. This communications link may use a medium that is, for example without limitation, physical or wireless.

The description of the present invention has been presented for the purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method of providing fair play in an online gaming environment, the method comprising the steps of:
    providing separate and distinct servers for controlling different aspects of an online game, including a deal server, a play server and an audit server;
    creating, in the deal server, a randomized set of gaming elements associated with a selected online game;
    encrypting the randomized set of gaming elements;
    signing the encrypted, randomized set of gaming elements with an electronic signature associated with the owner of the deal server;
    transmitting the set of randomized gaming elements to the play server, as well as through the internet to any players, the transmission to the players necessarily occurring through the audit server;
    verifying a "fair deal" at the play server by authenticating the electronic signature of the owner of the deal server;
    continuing to send commands from the play server to the deal server for requesting and receiving additional gaming elements, wherein neither the play server nor the deal server are connected to the internet; and
    continuing to receive commands from players at the play server from the audit server and in response sending additional gaming elements through the audit server to the players.

2. The method as defined in claim 1 wherein the audit server performs an additional encryption on the gaming elements transmitted to the players.

3. The method as defined in claim 1 wherein prior to encrypting the randomized set of gaming elements, the deal server adds prefix/suffix information to the randomized set of gaming elements so as to prevent attacks against the encryption.

4. The method as defined in claim 1 wherein prior to signing the encrypted, randomized set of gaming elements, the deal server adds an expiration date to the set of gaming elements.

5. The method as defined in claim 1 wherein prior to signing the encrypted, randomized set of gaming elements, the deal server adds information identifying the organization that owns and controls the deal server.

6. The method as defined in claim 1 wherein the gaming elements comprise a simulated deck of playing cards, and the play server is configured to transmit at least three commands to the deal server: a "new deal" command, a "new card" command", and a "finish deal" command, where the "new deal" command causes the deal server to send an encrypted deal to the play server, the "new card" command causes the deal server to send the next card in the randomized deck to the play server, and the "finish deal" command causes the deal server to send a proper decryption key to the play server, allowing for the play server to decrypt the encrypted deal.

7. The method as defined in claim 6, wherein in response to receiving a "new card" command, the deal server creates both a "face up" and a "face down" version of each card, with both versions transmitted to the play server in response to a "new card" command.

* * * * *